[19] United States Patent
Plummer

[15] 3,704,617
[45] Dec. 5, 1972

[54] METHOD AND APPARATUS FOR FABRICATING IMAGING MEANS
[72] Inventor: William T. Plummer, Concord, Mass.
[73] Assignee: Polaroid Corporation, Cambridge, Mass.
[22] Filed: Oct. 22, 1970
[21] Appl. No.: 83,029

[52] U.S. Cl. ..................................72/311, 72/447
[51] Int. Cl. ........................B21d 11/04, B21j 13/00
[58] Field of Search..........72/76, 414, 446, 447, 406, 72/433, 311, 450, 451; 18/44; 33/1 M, 189, 23 C

[56] References Cited

UNITED STATES PATENTS 3,239,941  3/1966  Ahmer...............................33/1 M X

FOREIGN PATENTS OR APPLICATIONS 212,468  3/1941  Switzerland............................72/414

Primary Examiner—Charles W. Lanham
Assistant Examiner—R. M. Rogers
Attorney—Brown & Mikulka, William D. Roberson and Michael Bard

[57] ABSTRACT

A method and apparatus is provided for fabricating novel imaging apparatus.

The subject invention accomplishes its purpose by employing a stylus which is driven into a base to produce a facet therein which is normal to the longitudinal axis of the stylus. he stylus is secured in predetermined relation with respect to a pair of points and is caused to traverse the surface of said base until a desired portion thereof is sufficiently covered with said facets. One of said pair of predetermined points corresponds to a point source of illumination or other electromagnetic radiation and the other of said pair of predetermined points corresponds to a point to which it is desired to reflect any electromagnetic radiation incident on said faceted base from said point source.

20 Claims, 3 Drawing Figures

PATENTED DEC 5 1972

INVENTOR.
WILLIAM T. PLUMMER

BY

Brown and Mikulka
and
Michael Bard
ATTORNEYS

METHOD AND APPARATUS FOR FABRICATING IMAGING MEANS

BACKGROUND OF THE INVENTION

The subject invention relates generally to apparatus for imaging light or other electromagnetic radiation from a point source to a predetermined remote point and, more particularly, to a method and apparatus for the fabrication thereof.

It is well known that various types of apparatus have been employed in the prior art for precisely imaging radiation emanating from a point source to a predetermined remote point. Such devices have found application in various photographic applications and have additionally found application in spectroscopic and spectrometric devices.

It is known that light appearing to emanate from a point source may be reflected to a predetermined remote point by means of an ellipse-shape mirror. In order to accomplish such imaging, it is necessary that the apparent point source be coincident with one of the foci of the ellipse and that the predetermined remote point to which it is desired to reflect light be coincident with the other foci if the ellipse. As a practical expedient, a concave spherical-shape mirror was often substituted for the ellipse configuration to provide point-to-point reflection of light. In order to utilize such a substitute, it is necessary that the point source be positioned off the optical axis of the spherical-shape mirror. The ease of obtaining and/or fabricating such a concave spherical mirror and, hence, the desirability of its use for the purposes aforesaid, is readily apparent.

Not infrequently, however, it is necessary that the optical means utilized for imaging a real or apparent point source to another point be essentially flat or planar. Where such is the case, it has been found expedient to resort to a mirror utilizing the principles of a Fresnel lens. Such a mirror may be envisioned by considering a concave hemispheric mirror divided into a plurality of frusta, each formed by the intersection of a pair of spaced parallel planes with said mirror and normal to the optical axis thereof. If each of said plural frusta are concentrically arranged on a flat surface, a reflective device will be created approximating the same optical qualities as said concave hemispheric mirror, but one which is essentially planar. Such a planar approximation of a concave hemispheric-shape mirror may be referred to as a Fresnel-type mirror.

It should be readily apparent that for many applications, the Fresnel-type mirror is preferred to its concave hemispheric-shape counterpart, if for no other reasons, than because of its compactness of size and ease of fabrication.

Unfortunately, the use of a concave spherical-shape mirror or its Fresnel-type counterpart entails several disadvantages. As is well known in the art, the use of such structures invariably results in attendant image distortion due to the inherent aberrations in the mirror structures, such as astigmatism and coma. Coma, of course, is an aberration affecting only points off the optical axis, and it is known that coma is directly proportional to the distance of such points from such optical axis. It is known, too, that astigmatism varies with the square of the image height and, hence, we find that the very use to which we desire to put the concave hemispheric-shape mirror or its Fresnel-type counterpart, is one wherein significant coma and astigmatism will be introduced.

In order to provide a relatively aberration-free compact and accurate point-to-point reflective means, the novel mirror which is the subject of copending application Ser. No. (Case 4100) filed on even date herewith by Nathan Gold and assigned to Polaroid Corp., the Assignee of the present application, was developed. Such a novel mirror will henceforth be referred to herein as a Gold-type mirror.

The instant invention was developed to provide a means for the manufacture of Gold-type mirrors accurately and efficiently.

Accordingly, it is an object of the present invention to provide a means for fabricating Gold-type mirrors.

Another object of the present invention is to provide a relatively simple and efficient means for the fabrication of Gold-type mirrors.

Still another object of this invention resides in the provision of a novel mechanical linkage for the automatic and efficient fabrication of Gold-type mirrors.

Yet another object of this invention resides in an extremely accurate and efficient method and means for automatically fabricating a master from which a die may be formed for the fabrication of Gold-type mirrors as by pressing, stamping, or rolling.

A further object of this invention is to provide means for automatically positioning a stylus with respect to a plate such that causing such stylus to successively impact said plate along a preselected portion of its surface will effect a Gold-type mirror.

Yet a further object of the instant invention resides in the provision of means for automatically shaping the surface of a non-reflective plate or the like to conform to that of a Gold-type mirror so that such a mirror may thereafter be formed by coating said formed surface with a reflective coating.

SUMMARY OF THE INVENTION

One aspect of the subject invention encompasses a novel linkage which secures said stylus for movement between a pair of arms each of which is movably secured at a different one of said predetermined points. Both of said arms are rotatable about a fixed axis passing through said predetermined points and each is further rotatable about a first movable axis normal to said fixed axis and axially movable along a second movable axis normal to said fixed axis and said first movable axis. The arms converge to an imaginary point, and the novel linkage secures the stylus in the plane of said arms such that said stylus always bisects the angle subtended by said arms.

A base to be fabricated into said novel image-forming means is fixedly positioned beneath said novel linkage such that said arms extend to a point on the surface of said base at all times. The stylus is driven axially between said arms so as to impact said base and form a facet in the surface thereof. The stylus is caused to traverse said base as by a cross-slide mechanism until a desired portion of the surface of the base is covered with said facets.

DESCRIPTION OF THE DRAWINGS

Other objects and many of the attendant advantages of the present invention will be better appreciated and said invention will become clearly understood with reference to the following detailed description when considered in conjunction with the accompanying drawings illustrating one embodiment of the instant invention, wherein.

DETAILED DESCRIPTION OF THE INVENTION

Figure 1:
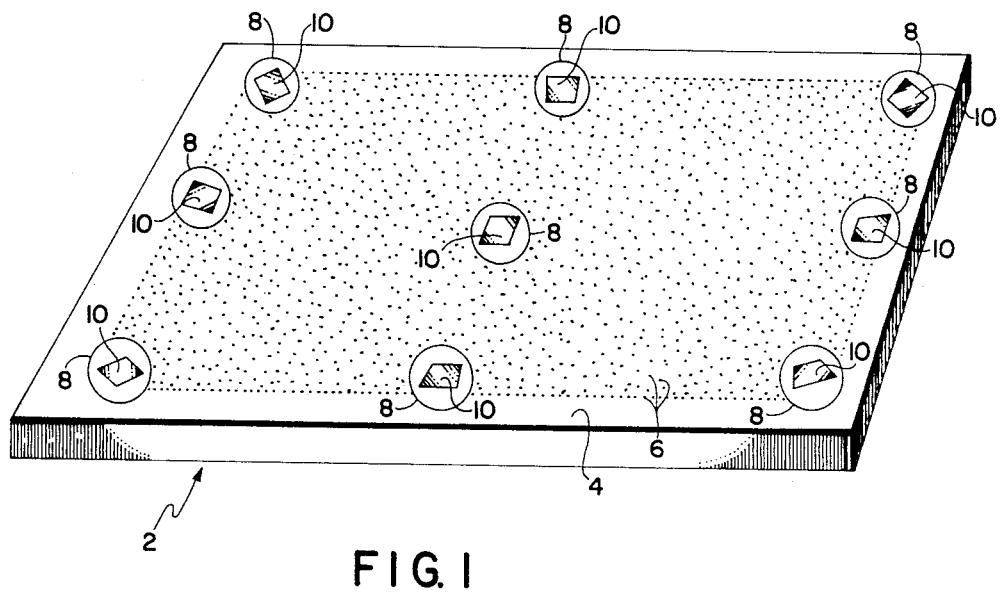
FIG. 1 provides a perspective of a Gold-type mirror.

Referring to the drawings in more detail and, more particularly, to FIG. 1, a Gold-type mirror is illustrated generally at 2 and is seen to comprise an essentially flat plate 4. One surface of the plate 4 is covered with a plurality of indentations 6, each of which, as best seen in enlarged details 8, comprises a facet 10. Each said facet 10 is reflective to light and is so spatially oriented that light impinging thereon from a fixed point source will be reflected therefrom to a predetermined remote point. In order to accomplish such reflection, each said facet 10 must be so spatially positioned as to be normal to the bisector of the angle included between a line drawn from said point source to said facet and a line drawn from said facet to said predetermined remote point.

As taught in copending application Ser. No. (Case 4100) mentioned hereinabove, the plate 4 may typically comprise aluminum or other suitable material and it may or may not be provided with a reflective coating on the faceted surface thereof.

Referring again to FIG. 2, the novel linkage portion of the present invention is shown generally at 12 and including a pivot support 14. The pivot support 14 is of generally rectangular cross-section and includes a pair of oppositely directed axially aligned gudgeons 16 and 18, respectively, extending from opposite end portions thereof. The pivot support 14 is provided with an opening 20 extending centrally therethrough and through the upper and lower surfaces thereof and a pair of link supports 22 and 24 are journaled in said pivot support 14 in predetermined spaced relationship. The link supports 22 and 24 are so journaled as to be rotatable about a pair of axes 26 and 28, respectively, both of which are normal to and intersect the common longitudinal axis 30 of the pivot support 14 and the gudgeons 16 and 18. The link supports 22 and 24 are provided with cylindrical openings 32 and 34, respectively, extending radially therethrough and a pair of cylindrical links 36 and 38 are slideably received within the openings 32 and 34, respectively, and extend through the link supports 22 and 24, respectively. For reasons which will be more apparent infra the cylindrical openings 32 and 34 are so positioned, with respect to the link supports 22 and 24, that the longitudinal axes of the links 36 and 38 will intersect the longitudinal axis 30 at its points of intersection 40 and 42 with the axes 26 and 28, respectively. It should be noted at this point that the intersection points 40 and 42 correspond to a pair of conjugate points about which more will be said infra.

The cylindrical link 36 is pivotally connected to a first pair of link arms 44 by means of a link support 46, fixedly secured to one end portion of the cylindrical link 36, and a pin 48. Similarly, the cylindrical link 38 is pivotally connected to a second pair of link arms 50 by means of a link support 52, fixedly secured to one end portion of said cylindrical link 38, and a pin 54. The end portions of said first and second pairs of link arms 44 and 50, respectively, remote from the link supports 46 and 52, respectively, are pivotally connected to each other and to a third link support 56, as by a pin 58. The third link support 56 is provided with a generally cylindrical opening 60 which extends longitudinally therethrough and is adapted to receive a cylindrical stylus 62, which functions as a graver, and about which more will be said infra.

A support 64, comprising a pair of spaced parallel plates 66 and 68, is positioned below the pivot support 14 and sandwiches the flattened end portions 70 and 72 of the links 36 and 38, respectively. The links 36 and 38 are pivotally secured to said support 64 at the end portions 70 and 72, respectively in predetermined spaced relationship, as by pins 74 and 76, respectively.

The support 64 is provided with cylindrical-shape recesses 78 and 80 extending transversely of the plates 66 and 68, respectively, midway between the pins 74 and 76. The plates 66 and 68 and their respective cylindrical-shape recesses 78 and 80 are of such depth and configuration as to slideably receive one end portion of the stylus 62 and maintain same midway between the pins 74 and 76 whilst pivotal about an imaginary axis parallel to the longitudinal axes of the pins 74 and 76, lying in the plane thereof, and midway therebetween. The stylus 62 extends through the support 64 to a frusto-conical tip 82 having a flat end 84 perpendicular to the longitudinal axis of said stylus 62. A pneumatic driving tool 86, such as is commonly employed in the engraving arts, may be connected to the stylus 62 via a collar 88 so as to effect the oscillatory sliding of said stylus 62 within the opening 60 and the cylindrical-shape recesses 78 and 80, respectively, such that the tip 82 oscillates toward and away from the support 64.

Figure 3:
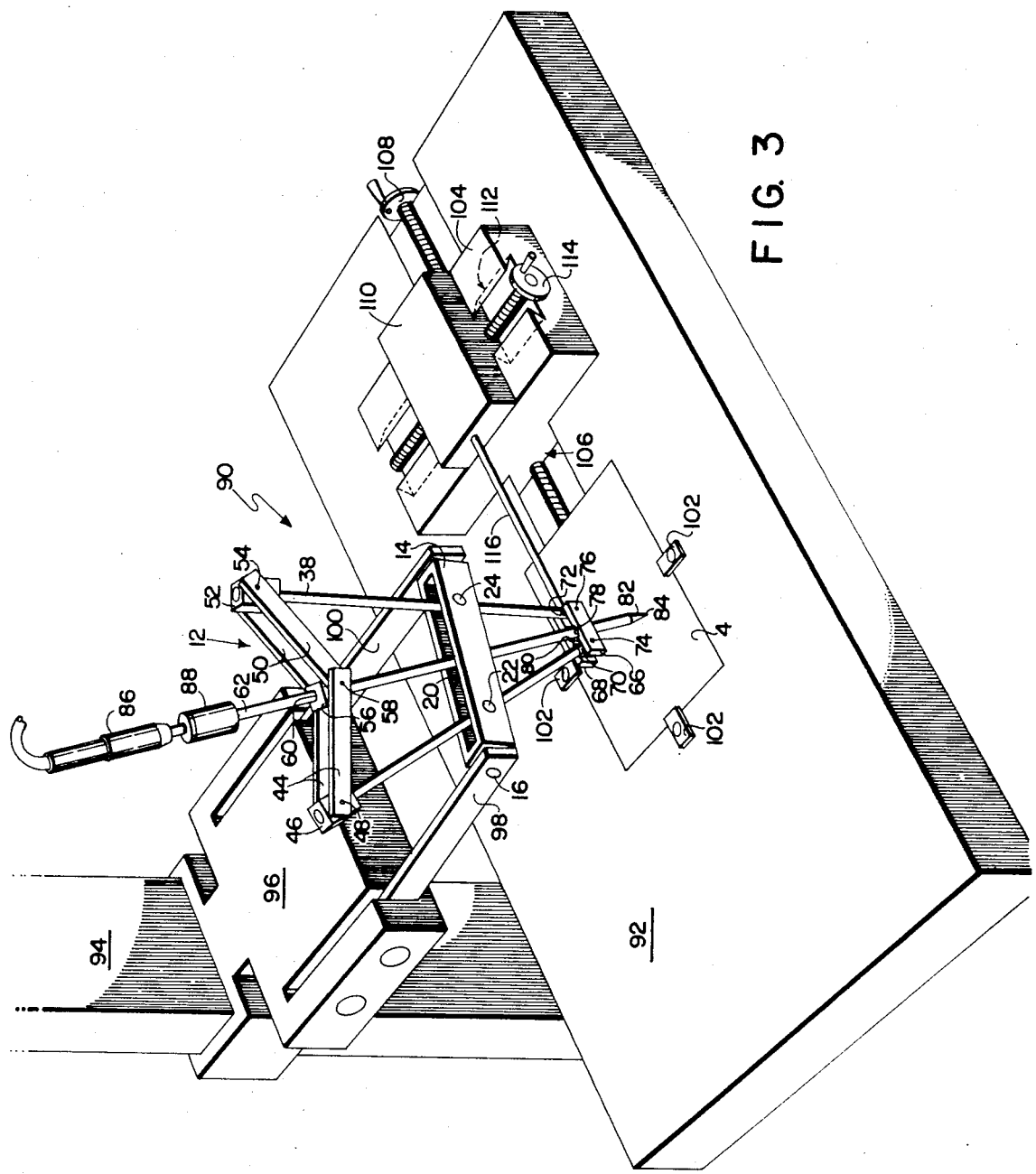
FIG. 3 provides a simplified perspective of the present invention.

Referring again to FIG. 3, the subject invention is illustrated generally at 90 and is seen to include a base 92 to which is affixed a vertical support 94. An adjustable mount 96 is secured to said support 94 so as to be vertically slideable thereon and extends normal thereto over the base 92. The mount 96 may be secured at any desired height on the support 94 as by means of set screws (not shown). The novel linkage mechanism 12 is supported above the base 92 in predetermined spatial orientation with respect thereto by means of arms 98 and 100 which are secured to the mount 96 and extend over the base 92 and rotatably receive the gudgeons 16 and 18, respectively. Thus, the linkage mechanism 12 is rotatable about the axis 30 via the gudgeons 16 and 18.

The plate 4 of FIG. 1 is secured to the base 92 beneath the pivot support 14 and in predetermined spaced relation to the points 40 and 42 (illustrated in FIG. 2), as by clamp assemblies 102. It should be noted at this point that the spatial orientation of the pivot support 14 may be adjusted as desired, as by suitably moving the arms 98 and 100, and that the axis 30 need not be horizontal.

A platform 104 is secured to the base 92 via a dovetail slide 106 and threadably engages a lead screw and crank assembly 108 which functions to drive the platform 104 longitudinally along the base 92 via the dovetail slide 106. A cross-slide 110 is secured to the platform 104 via a dovetail slide 112 and threadably engages a lead screw and crank assembly 114 so as to transversely traverse the platform 104 in response to rotation of said lead screw and crank assembly 114. The direction of movement of the cross-slide 110 with respect to the platform 104 is perpendicular to that of the platform 104 with respect to the base 92. Thus, rotation of both crank and lead screw assemblies 108 and 114 will cause the cross-slide 110 to traverse the base 92 in two mutually orthogonal directions.

The support 64 of the novel linkage assembly 12 is connected to the cross-slide 110 via a connecting rod 116. Accordingly, the support 64 and the tip 82 of the stylus 62 extending therebeyond will be caused to follow the movement of the cross-slide 110.

Figure 2:
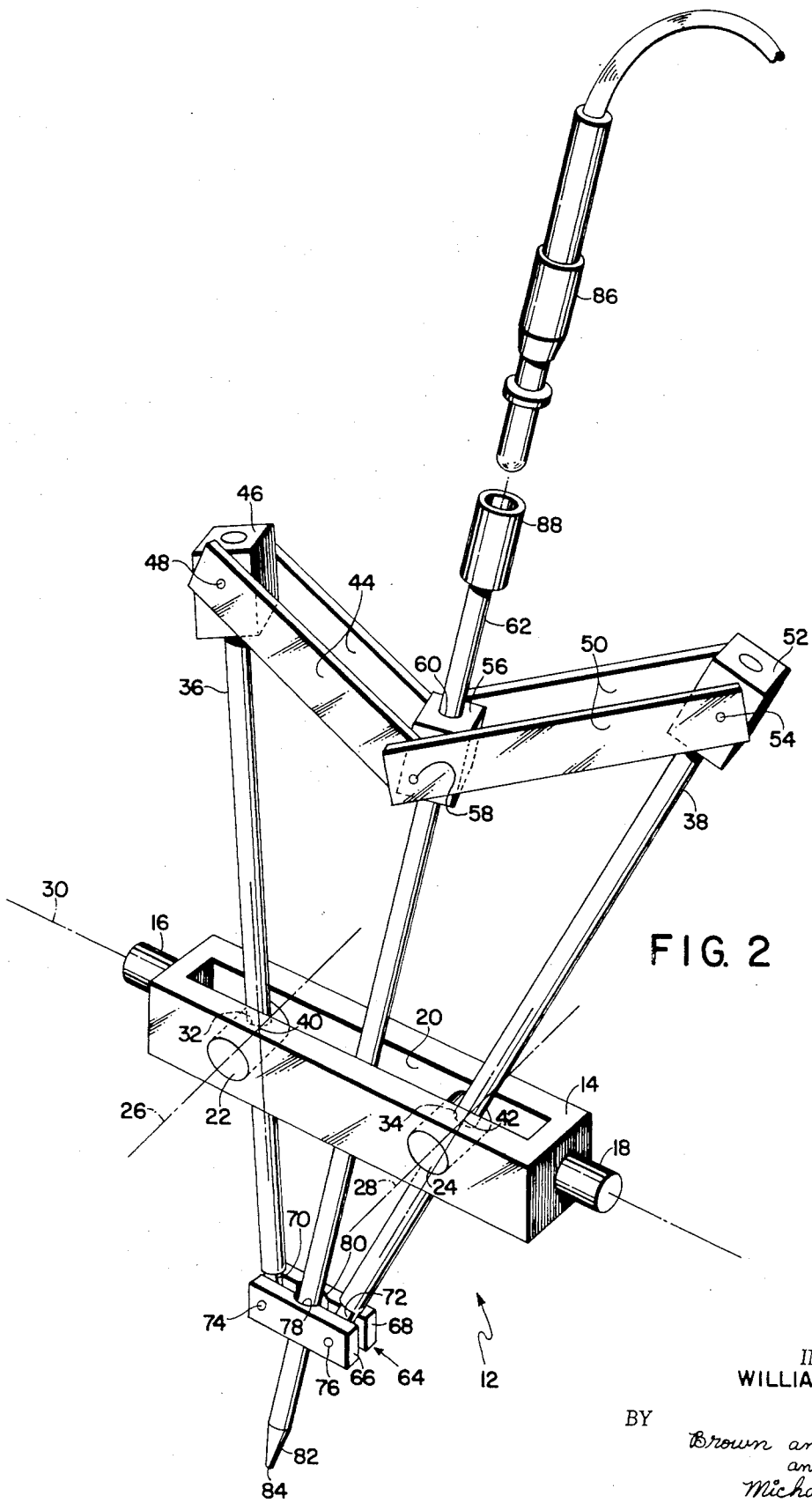
FIG. 2 provides a perspective of the stylus positioning portion and novel linkage of the present invention.

As mentioned hereinabove, the intersection points 40 and 42 (FIG. 2) correspond to a pair of conjugate points and may, for example, represent a point source of illumination and a predetermined point to which it is desired to reflect light emanating from such point source of illumination, respectively. Considering the operation of the instant invention in more detail, the plate 4 is secured to the base 92 beneath the novel linkage 12 and in predetermined spatial relationship to the intersection points 40 and 42 (FIG. 2). The tip 82 of the stylus 62 is then caused to traverse said plate 4 by either independent or concurrent movement of the lead screw and crank assemblies 108 and 114. Simultaneously, the pneumatic driver 86 will cyclically drive the stylus 62 and its tip 82 toward and away from said plate 4 causing said tip 82 to impact the top surface of said plate 4 and create a permanent indentation therein conforming to the surface 84. The tip 82 of the stylus 62 is caused to traverse the top surface of said plate 4 until a desired area of the surface thereof is covered with indentations 6, each corresponding to a facet 10 as illustrated in FIG. 1.

It should be emphasized at this point that the link arms 44 and 50 are of equal length and, hence, the perpendicular distance between the pin 48 and the pin 58 equals that between said pin 58 and said pin 54. Also, regardless of the position of the tip 82 with respect to the surface of the plate 4, the longitudinal axes of the cylindrical links 36 and 38 will pass through the intersection points 40 and 42 (FIG. 2), respectively. Thus, it should be clear that as the tip 82 of the stylus 62 traverses the top surface of the plate 4, the angle between the cylindrical links 36 and 38 will vary.

Nevertheless, independent of the relative positions of the cross-slide 110 and the platform 104, the stylus 62 will bisect the angle formed by the links 36 and 38. Accordingly, each facet 10 (FIG. 1) formed on the surface of the plate 4 will conform to the surface 84 and be normal to the longitudinal axis of the stylus 62.

Furthermore, the novel linkage 12 is so dimensioned that the longitudinal axes of the cylindrical links 36 and 38 converge so as to intersect approximately at the surface 84 of the tip 82. In view of the foregoing, it should now be clear that each of the facets 10 (FIG. 1) will be normal to a line bisecting the angle subtended by two lines, each passing through a different one of a pair of conjugate points (corresponding to the intersection points 40 and 42) and intersecting at said facet. If a point source of illumination or other electromagnetic radiation were positioned at either one of said pair of conjugate points, any radiation therefrom incident on the faceted surface of said plate 4 would be reflected therefrom to the other of said conjugate points.

It should now be apparent that a Gold-type mirror may be manufactured for a particular pair of conjugate points by so designing the pivot support 14 and the journaled link supports 22 and 24, and by suitably spatially positioning the pivot support 14, that the intersection points 40 and 42 correspond to the desired pair of conjugate points.

It can readily be seen that many variations and modifications of the present invention are possible in light of the aforementioned teachings, and it will be apparent to those skilled in the art that various changes in form and arrangement of components may be made to suit requirements without departing from the spirit and scope of the invention. It is therefore to be understood that within the scope of the appended claims, the instant invention may be practised in a manner otherwise than is specifically described herein.

What is claimed is:

1. Apparatus for fabricating a specular imaging device from a work blank, including:

means defining a pair of stationary spaced reference points;

an elongated graver or the like for shaping the surface of said work blank; and means for causing said graver or the like to traverse the surface of said work blank such that the longitudinal axis of said graver or the like will always effectively bisect the angle formed by a pair of lines lying in the plane of said longitudinal axis and extending through said reference points so as to effectively intersect at the intersection of said longitudinal axis with said surface.

2. Apparatus according to claim 1, wherein said traverse causing means includes a support rotatably mounted about an axis passing through said pair of reference points.

3. The invention as recited in claim 2, additionally including a pair of equal length arms, each connected to said support such that its respective longitudinal axis extends through a different one of said reference points.

4. The invention as related in claim 3, wherein each of said arms is connected to said support so as to be simultaneously rotatable with said support, axially slideable through its respective reference point and rotatable about an axis passing through its respective reference point and normal to the axis of rotation of said support.

5. The invention as described in claim 4, further including a pair of connecting links pivotally connected to each other and each pivotally connected to one end of a different one of said arms such that the distances from their common pivot to their pivotal connection to their respective arms are equal.

6. The invention as delineated in claim 5, wherein said graver or the like is pivotally connected to the common pivot of said pair of connecting links so as to be axially slideable therethrough.

7. The invention as set forth in claim 6, further including means pivotally connected to the end portions of both said arms remote from said connecting links such that the longitudinal axes of both said arms effectively intersect on the longitudinal axis of said graver or the like.

8. The invention as recited in claim 7, wherein the pivotal connections of said last-mentioned means with each of said arms are equi-distant from the longitudinal axis of said graver or the like.

9. The invention as described in claim 8, further including means for axially driving said graver or the like.

10. The invention of claim 9, wherein said graver or like extends to a generally frusto-conical shape tip having a predetermined end surface geometry.

11. The invention as delineated in claim 10, further including a base and means for rotatably securing said support and said reference points in predetermined spaced relation with respect to said base.

12. The invention as set forth in claim 11, additionally including:
 a platform slideably secured to said base;
 cross-slide means slideably secured to said platform; and
 means fixedly connected to said cross-slide means for slaving said graver or the like thereto.

13. The invention as set forth in claim 12, further including means for driving said platform across said base and means for driving said cross-slide across said platform transverse to the direction of travel of said platform.

14. The invention as stated in claim 13, additionally including means for securing a shapable work blank to said base in predetermined spaced relation to said reference points.

15. A method for fabricating specular imaging devices, including the steps of:
 positioning a plate or the like in predetermined stationary spaced relation to a pair of spaced reference points;
 traversing said plate with the tip of a stylus or the like;
 causing said stylus or the like to continually bisect the angle formed by a pair of lines extending through said reference points and intersecting at said tip whilst traversing said plate; and
 causing said tip to impact said plate whilst traversing same so as to form plural discrete facets therein.

16. The method of claim 15, wherein said stylus tip or the like is caused to traverse said plate in parallel straight lines and is cyclically caused to impact said plate whilst traversing same.

17. A mechanism for the manufacture of reflective imaging apparatus, including:
 means defining a pair of spaced reference points;
 stylus means, and
 means for causing said stylus means to impact the surface of a plate or the like and form plural indented surfaces therein each normal to a line bisecting the angle formed by extending a line through each of said reference points so as to intersect at such indented surface.

18. The invention as related in claim 17, wherein the longitudinal axis of said stylus means is always coincident with said angle bisecting line corresponding to the facet being formed.

19. Apparatus according to claim 18, wherein said impact causing means includes a linkage mechanism having a first pair of pivotally connected equal length arms and a second pair of pivotally connected equal length arms pivotally connected to said first pair of equal length arms.

20. The invention according to claim 19, wherein said first and second pairs of equal length arms are both rotatable about an axis passing through said pair of reference points.

* * * * *